United States Patent
Berthereau et al.

(10) Patent No.: US 6,764,973 B2
(45) Date of Patent: Jul. 20, 2004

(54) GREY GLASS COMPOSITIONS OF THE SILICA-SODA-LIME TYPE

(75) Inventors: Anne Berthereau, Challes les Eaux (FR); Dominique Sachot, Ozoire la Ferriere (FR)

(73) Assignee: Saint-Gobain Glass France, Courbevoie (FR)

( * ) Notice: Subject to any disclaimer, the term of this patent is extended or adjusted under 35 U.S.C. 154(b) by 0 days.

(21) Appl. No.: 10/215,026

(22) Filed: Aug. 9, 2002

(65) Prior Publication Data

US 2003/0148869 A1 Aug. 7, 2003

Related U.S. Application Data

(63) Continuation of application No. PCT/FR01/00400, filed on Feb. 9, 2001.

(30) Foreign Application Priority Data

Feb. 11, 2000 (FR) .......................................... 00 01764

(51) Int. Cl.$^7$ .............................................. C03C 3/087
(52) U.S. Cl. ........................................... 501/71; 501/70
(58) Field of Search ............................... 501/65, 70, 71

(56) References Cited

U.S. PATENT DOCUMENTS 5,952,255 A * 9/1999 Seto et al. .................... 501/71
5,998,316 A * 12/1999 Seto et al. .................... 501/71
6,333,287 B1 * 12/2001 Seto .............................. 501/70
2003/0008759 A1 * 1/2003 Costin et al. ................. 501/32
2003/0083188 A1 * 5/2003 Seto et al. .................... 501/71
2003/0114290 A1 * 6/2003 Landa et al. .................. 501/64

FOREIGN PATENT DOCUMENTS

| EP | 0 522 859 A2 | 1/1993 |
| EP | 0 816 296 A1 | 1/1998 |
| EP | 0 849 233 A1 | 6/1998 |
| WO | WO 97/23422 | 7/1997 |
| WO | WO 99/47463 | 9/1999 |

* cited by examiner

Primary Examiner—Karl Group
Assistant Examiner—Elizabeth A. Bolden
(74) Attorney, Agent, or Firm—Oblon, Spivak, McClelland, Maier & Neustadt, P.C.

(57) ABSTRACT

The invention concerns a grey glass composition of the soda-lime type having a global light transmission under an illuminant A ($T_{LA}$) more than 15% for a glass thickness equal to 4.85 mm, said composition comprising colouring agents as follows in the following weight percentage limits: $Fe_2O_3$: 0.25–0.65%, preferably 0.3–0.6% and more preferably still 0.3–0.4%; CoO: 150–250 ppm and preferably>185 ppm; NiO: 650–1000 ppm; Se<5 ppm.

17 Claims, No Drawings

GREY GLASS COMPOSITIONS OF THE SILICA-SODA-LIME TYPE

CROSS-REFERENCE TO RELATED APPLICATIONS

This application is a continuation of the U.S. National Stage designation of co-pending International Patent Application PCT/FR01/00400, filed Feb. 9, 2001, which claims priority to French Patent Application No. 00/01764, filed Feb. 11, 2000, the entire contents of which are expressly incorporated herein by reference thereto.

FIELD OF THE INVENTION

The invention relates to glass compositions of the silica-soda-lime type, intended for the production of flat glasses. Although the invention is not limited to such an application, it will be more particularly described with reference to applications for motor vehicles, especially side windows.

BACKGROUND OF THE INVENTION

Glazing intended for the motor-vehicle industry is subject to various requirements, especially with regard to its optical properties; these requirements are governed by regulations, for example with regard to light transmission of a windscreen or else with respect to concern for the comfort of the user, for example with regard to energy transmission, or indeed with respect to concern for the aesthetic appearance, especially with regard to colour.

With regard to side windows, the requirements in terms of light transmission and of energy transmission may be less strict than in the case of windscreens. On the other hand, motor-vehicle manufacturers impose requirements in terms of colour and more specifically with regard to the dominant wavelength.

The colour of glazing is obtained by the addition of colouring agents in the batch materials intended to be melted in order to produce the glass matrix. These colouring agents are, for example, iron, selenium, nickel, chromium, cobalt, tungsten, vanadium, cerium, etc.

Some of these oxides are costly and for this reason are avoided or used in very small amounts; other agents are deemed to be very polluting and require filtration plants which during melting are between 70 and 85%, thus coming into this latter category and deemed to be very polluting. Furthermore, it is very difficult to control the chemistry because of the existence of several oxidation states of selenium in a glass.

Moreover, to produce grey glass, it is normal practice to use selenium. Melting plants are therefore provided with filtration systems specific to this element in order to prevent polluting of the atmosphere, making it expensive to produce these compositions.

The inventors were thus given the task of designing grey glass compositions of the silica-soda-lime type which have an overall light transmission under illuminant A ($T_{LA}$) of greater than 15% for a thickness of 4.85 mm, the production, and especially the melting, of which is less expensive than the solutions already known, and the risks of pollution, especially due to selenium, being eliminated.

SUMMARY OF THE INVENTION

The invention relates to a grey glass composition of the silica-soda-lime type having an overall light transmission under illuminant A ($T_{LA}$) of greater than 15% for a thickness of 4.85 mm and having the colouring agents given below within the following weight limits:

| | |
|---|---|
| $Fe_2O_3$ | 0.25–0.7% |
| CoO | 150–250 ppm and preferably >185 ppm |
| NiO | 650–1000 ppm |
| Se | <5 ppm | where $Fe_2O_3$ is the total iron.

The inventors have thus been able to determine novel grey glass compositions which may be produced relatively inexpensively and the selenium pollution risk of which is completely eliminated. This is because the selenium values according to the invention correspond to values of impurities that can be provided by certain batch materials. The manufacturing costs are thus reduced since filtration plants, such as those described above, which are often expensive, are unnecessary according to the invention.

The NiO content is preferably greater than 700 ppm and more preferably between 850 and 880 ppm.

According to a preferred embodiment of the invention, the overall energy transmission $T_E$ is less than 37%, preferably less than 30% and even more preferably less than 25% for a thickness of 4.85 mm. Such requirements correspond in particular to those required for motor-vehicle applications in order to ensure the comfort of persons in the passenger compartment.

More preferably still, the glass composition has a redox of less than 0.25% and preferably less than 0.22%. The redox is defined by the ratio of the FeO content to the total iron content, expressed in the form of $Fe_2O_3$, the contents being expressed as percentages by weight.

According to an advantageous embodiment of the invention, and in particular for applications of the motor-vehicle side window type, the overall light transmission under illuminant A ($T_{LA}$) is greater than or equal to 20% and preferably less than 25%.

The grey glasses according to the invention advantageously have a dominant wavelength under illuminant C of between 485 and 495 nm.

Preferably, the glass composition according to the invention has the following colorimetric coordinates under illuminant C in the L*,a*,b* system:

| | |
|---|---|
| L*: | 53 |
| a*: | −10 to −2.5 |
| b*: | −8 to −0.5. |

The L*,a*,b* coordinates are defined in the CIELAB system in which L* represents the lightness, a* represents the red-green chromatic component and b* represents the yellow-blue chromatic component.

According to a first variant of the invention, the glass composition has the following colorimetric coordinates under illuminant C:

| | |
|---|---|
| L*: | 53 |
| a*: | −6 to −2.5 |
| b*: | −8 to −3. |

The colorimetric coordinate B* in this variant may further be between −6 to −3.

According to a second variant of the invention, corresponding to glass compositions intended for the production of glazing providing enhanced energy protection, the glass composition has the following colorimetric coordinates:

| | |
|---|---|
| L*: | 53 |
| a*: | −10 to −5 |
| b*: | −8 to −0.5. |

According to a preferred embodiment of the invention, the glass composition comprises the constituents given below within the following weight limits:

| | |
|---|---|
| $SiO_2$ | 64–75% |
| $Al_2O_3$ | 0–5% |
| $B_2O_3$ | 0–5% |
| CaO | 5–15% |
| MgO | 0–5% |
| $Na_2O$ | 10–18% |
| $K_2O$ | 0–5%. |

With regard to the oxide MgO, according to a first embodiment of the invention, its content is advantageously greater than 2%, in particular for economic reasons.

According to another embodiment, its content is less than 2%; it has been shown that such MgO contents characterize the composition according to the invention by a shift of the maximum of the FeO absorption band to long wavelengths. The limitation of the amount of MgO to 2% and, preferably, its elimination in the glasses of the invention, as intentional addition, make it possible for the infrared absorptivity of the glass to be actually increased. Complete elimination of MgO, which plays an important role in respect of the viscosity, may be at least partly compensated for by an increase in the $Na_2O$ and/or $SiO_2$ content.

BaO, which allows the light transmission to be increased, may be added to the compositions according to the invention in contents of less than 4%. This is because BaO has a much weaker effect on the viscosity of the glass than MgO and CaO. Within the context of the invention, the increase in BaO is essentially to the detriment of the alkali metal oxides, of MgO and above all of CaO. Any significant increase in BaO therefore helps to increase the viscosity of the glass, especially at low temperatures. In addition, introducing a high amount of BaO raises the cost of the composition appreciably. When the glasses of the invention contain barium oxide, the amount of this oxide is preferably between 0.5 and 3.5% by weight.

Apart from complying with the abovementioned limits in the case of the variation of the content of each alkaline-earth metal oxide, it is preferable for obtaining the desired transmission properties to limit the sum of the amounts of MgO, CaO and BaO to a value equal to or less than 13%.

When the intention is to produce coloured glasses, the glass compositions may also include one or more colouring agents such as $CeO_2$, $TiO_2$, $Cr_2O_3$, $V_2O_5$, $WO_3$, $La_2O_3$, etc.

The glasses according to the invention may also contain up to 1% of other constituents provided by the impurities of the glass batch materials and/or from the incorporation of cullet into the glass batch and/or coming from the use of refining agents ($SO_3$, Cl, $Sb_2O_3$, $AS_2O_3$)

To facilitate the melting, and especially to make the latter mechanically beneficial, the matrix advantageously has a temperature corresponding to a viscosity η such that logη=2, less than 1500° C. More preferably still, and especially when producing the substrate from a glass ribbon obtained using the "float" technique, the matrix has a temperature corresponding to the viscosity η, expressed in poise, such that logη=3.5, T logη=3.5 and a liquidus temperature $T_{liq}$ which satisfy the relationship:

$$T(\log\eta=3.5)-T_{liq}>20° C.$$

and preferably the relationship:

$$T(\log\eta=3.5)-T_{liq}>50° C.$$

The invention also concerns a grey glass composition of the soda-lime type having a global light transmission under an illuminant A ($T_{LA}$) more than 15% for a glass thickness equal to 4.85 mm, said composition comprising colouring agents as follows in the following weight percentage limits: $Fe_2O_3$: 0.25–0.65%, preferably 0.3–0.6% and more preferably still 0.3–0.4%; CoO: 150–250 ppm and preferably>185 ppm; NiO: 650–1000 ppm; Se>5 ppm.

DETAILED DESCRIPTION OF PREFERRED EMBODIMENTS

In order for the advantages of the present invention to be more fully appreciated, examples of glass compositions and their properties are given below.

Several series of glasses were produced from the compositions given in the tables which follow. All these glasses were produced under approximately identical oxidation-reduction conditions; their redox is between 0.18 and 0.22.

These tables also indicate the values of the following properties, measured for thicknesses of 4.85 mm:

- the overall light transmission factor under illuminant A ($T_{LA}$) between 380 and 780 nm;
- the overall energy transmission factor $T_E$ integrated between 295 and 2500 nm according to the Parry Moon Mass 2 standard;
- the a*,b*,L* colorimetric coordinates, under illuminant C;
- the dominant wavelength under illuminant C;
- the purity under illuminant C.

Each of the compositions illustrated in the tables was produced from the following glass matrix, the contents of which are expressed in percentages by weight, the silica content being corrected in order to match with the contents of the colouring agents added:

| | |
|---|---|
| $SiO_2$ | 71.00% |
| $Al_2O_3$ | 0.70% |
| CaO | 8.90% |
| MgO | 3.80% |
| $Na_2O$ | 14.10% |
| $K_2O$ | 0.10% |

The temperatures corresponding to the viscosities, expressed in poise, such that logη=2 and logη=3.5, T log2 and T log3.5, and the liquidus temperature $T_{liq}$ are identical for all the glasses, these being produced from the same glass matrix, and are the following:

| | |
|---|---|
| Tlog2 (° C.) | 1410 |
| Tlog3.5 (° C.) | 1100 |
| $T_{LIQ}$ (° C.) | 1060 |

The first glass, called R, is a reference glass whose composition is standard for glazing intended for motor vehicles.

The glasses in the first table, numbered from 1 to 9, are examples which were produced according to the invention and the compositions of which were measured.

The glasses in the second table, numbered from 10 to 16, are given with their theoretical compositions, these not having been measured subsequently; it should be understood that the losses of oxides during melting are approximately 25 to 50 ppm in the case of NiO, from 15 to 20 ppm in the case of CoO and around 10 ppm in the case of $Cr_2O_3$.

TABLE 1

|  | R | 1 | 2 | 3 | 4 | 5 | 6 | 7 | 8 | 9 |
|---|---|---|---|---|---|---|---|---|---|---|
| $Fe_2O_3$ | 1.50 | 0.6 | 0.4 | 0.34 | 0.35 | 0.435 | 0.585 | 0.38 | 0.34 | 0.325 |
| Redox | 0.24 | 0.215 | 0.213 | 0.194 | 0.203 | 0.193 | 0.209 | 0.218 | 0.20 | 0.205 |
| Se (ppm) | 15 | <5 | <5 | <5 | <5 | <5 | <5 | <5 | <5 | <5 |
| CoO (ppm) | 145 | 160 | 185 | 185 | 190 | 200 | 160 | 180 | 190 | 185 |
| NiO (ppm) | 0 | 720 | 800 | 850 | 870 | 720 | 700 | 800 | 870 | 900 |
| $Cr_2O_3$ (ppm) | 90 | 140 | 0 | 0 | 0 | 140 | 140 | 0 | 0 | 0 |
| $T_{LA}$ (%) 4.85 mm | 19.3 | 20.9 | 20.5 | 20.5 | 20.4 | 19.4 | 20.5 | 20.8 | 20.4 | 20.1 |
| $T_E$ (%) 4.85 mm | 12.3 | 25.7 | 33.1 | 35.3 | 35.7 | 30 | 25.2 | 32.6 | 35.8 | 34.9 |
| a* (C) | −8.35 | −9.41 | −5.50 | −5.19 | −4.90 | −8.06 | −9.53 | −5.58 | −4.99 | −5.38 |
| b* (C) | 3.09 | −1.63 | −3.06 | −1.89 | −3.81 | −4.84 | −1.83 | −3.35 | −3.76 | −1.00 |
| L* (C) | 51.62 | 53.83 | 53.18 | 53.01 | 53.06 | 52.28 | 53.46 | 53.53 | 51.6 | 52.5 |
| λd (C) nm | 516 | 492 | 488 | 490 | 487 | 488 | 492 | 488 | 487 | 492 |
| P (C) | 3.62 | 8.84 | 7.97 | 6.23 | 8.55 | 12.23 | 9.22 | 8.36 | 8.50 | 5.26 |

TABLE 2

|  | R | 10 | 11 | 12 | 13 | 14 | 15 | 16 |
|---|---|---|---|---|---|---|---|---|
| $Fe_2O_3$ | 1.50 | 0.45 | 0.45 | 0.4 | 0.3 | 0.35 | 0.3 | 0.6 |
| Redox | 0.24 | 0.186 |  | 0.195 | 0.203 |  |  |  |
| Se (ppm) | 15 | <5 | <5 | <5 | <5 | <5 | <5 | <5 |
| CoO (ppm) | 145 | 220 | 220 | 205 | 205 | 205 | 205 | 190 |
| NiO (ppm) | 0 | 700 | 700 | 850 | 850 | 850 | 925 | 750 |
| $Cr_2O_3$ (ppm) | 90 | 100 | 150 | 0 | 0 | 0 | 0 | 0 |
| $T_{LA}$ (%) 4.85 mm | 19.3 | 20.4 | 20.2 | 20.5 | 21 | 20.7 | 19.8 | 21.3 |
| $T_E$ (%) 4.85 mm | 12.3 | 31.8 | 33.2 | 31.6 | 38.3 | 35.2 | 35.9 | 26.3 |
| a* (C) | −8.35 | −6.64 | −7.52 | −6.1 | −4.8 | −5.26 | −5.1 | −7 |
| b* (C) | 3.09 | −7.60 | −5.64 | −3.15 | −3.8 | −3.46 | −1.67 | −4.45 |
| L* (C) | 51.62 | 53 | 53.47 | 53.19 | 53.35 | 53.01 | 52.14 | 54.26 |
| λd (C) nm | 516 | 485 | 487 | 488 | 487 | 487 | 490 | 487 |
| P (C) | 3.62 | 14.68 | 12.75 | 8.48 | 8.39 | 8.29 | 5.95 | 10.67 |

Examples 1 to 16 produced according to the invention show that it is possible to obtain grey glasses satisfying the light transmission and possibly energy constraints that were set, without using the colouring agent selenium. Such glass compositions can therefore be melted with relatively low costs, since selenium filtration plants are unnecessary, and in addition the pollution risks due to this agent are eliminated.

What is claimed is:

1. A silica-soda-lime type grey glass composition comprising the following coloring agents within the following weight limits:

| total iron oxide $Fe_2O_3$ | at least 0.25 and lass than 0.65% |
|---|---|
| CoO | 150–250 ppm |
| NiO | 650–1000 ppm |
| Se | <5 ppm, | wherein the composition has an overall light transmission under illuminant A ($T_{LA}$) of greater than 15% and less than 25% for a glass thickness equal to 4.85 mm.

2. The glass composition of claim 1, wherein said CoO is present in an amount greater than 185 ppm.

3. The glass composition of claim 1, wherein the composition has a redox of less than 0.25%.

4. The glass composition of claim 1, wherein the composition has a redox of less than 0.22%.

5. The glass composition of claim 1, wherein the composition has an overall energy transmission less than 37% for a thickness of 4.85 mm.

6. The glass composition of claim 1, wherein the composition has an overall energy transmission less than 25% for a thickness of 4.85 mm.

7. The glass composition of claim 1, wherein the composition has an overall light transmission factor under illuminant A ($T_{LA}$) of greater than or equal to 20% and less than 25%.

8. The glass composition of claim 1, wherein in a (L*, a*, b*) colorimetric system defining colorimetric coordinates of lightness L*, red-green chromatic component a*, and yellow-blue chromatic component b*, the following conditions are satisfied:

| L*: | 53 |
|---|---|
| a*: | −10 to −2.5 |
| b*: | −8 to −0.5. |

9. The glass composition of claim 8, wherein the following conditions are satisfied:

| | |
|---|---|
| L*: | 53 |
| a*: | −6 to −2.5 |
| b*: | −6 to −3. |

10. The glass composition of claim 8, wherein the following conditions are satisfied:

| | |
|---|---|
| L*: | 53 |
| a*: | −10 to −5 |
| b*: | −8 to −0.5. |

11. The glass composition of claim 1, wherein said composition further comprises, in percentages by weight, the following constituents:

| | |
|---|---|
| $SiO_2$ | 64–75% |
| $Al_2O_3$ | 0–5% |
| $B_2O_3$ | 0–5% |
| CaO | 5–15% |
| MgO | 0–5% |
| $Na_2O$ | 10–18% |
| $K_2O$ | 0–5%. |

12. The glass composition of claim 1, further comprising at least one coloring agent selected from the group consisting of $CeO_2$, $TiO_2$, $Cr_2O_3$, $V_2O_5$, $WO_3$ and $La_2O_3$.

13. The glass composition of claim 1, wherein the difference between the temperature corresponding to a viscosity η expressed in poise, such that logη=3.5, and the liquidus temperature $T_{liq}$ is greater than 20°C.

14. The glass composition of claim 1, wherein the difference between the temperature corresponding to a viscosity η expressed in poise, such that logη=3.5, and the liquidus temperature $T_{liq}$ is greater than 50° C.

15. The glass composition of claim 1, wherein the temperature corresponding to a viscosity η, expressed in poise, such that logη=2, is less than 1500° C.

16. The glass composition of claim 1, wherein the total iron oxide $Fe_2O_3$ is 0.3–0.6%.

17. The glass composition of claim 1, wherein the total iron oxide $Fe_2O_3$ is 0.3–0.4%.

* * * * *